US010442371B2

(12) United States Patent
Kimura

(10) Patent No.: US 10,442,371 B2
(45) Date of Patent: Oct. 15, 2019

(54) ATTACHMENT MEMBER FOR WIRE GUIDING DEVICE

(71) Applicant: SUMITOMO WIRING SYSTEMS, LTD., Yokkaichi-shi, Mie (JP)

(72) Inventor: Yu Kimura, Yokkaichi (JP)

(73) Assignee: SUMITOMO WIRING SYSTEMS, LTD., Yokkaichi, Mie (JP)

( * ) Notice: Subject to any disclaimer, the term of this patent is extended or adjusted under 35 U.S.C. 154(b) by 66 days.

(21) Appl. No.: 15/770,296

(22) PCT Filed: Nov. 6, 2015

(86) PCT No.: PCT/JP2015/081314
§ 371 (c)(1),
(2) Date: Apr. 23, 2018

(87) PCT Pub. No.: WO2017/077640
PCT Pub. Date: May 11, 2017

(65) Prior Publication Data
US 2018/0312118 A1 Nov. 1, 2018

(51) Int. Cl.
B60R 16/02 (2006.01)
H02G 3/10 (2006.01)
H05K 5/02 (2006.01)
H02G 3/04 (2006.01)

(52) U.S. Cl.
CPC ...... *B60R 16/0207* (2013.01); *B60R 16/0215* (2013.01); *H02G 3/0462* (2013.01); *H05K 5/02* (2013.01); *E05Y 2900/531* (2013.01); *H02G 3/0487* (2013.01); *H02G 3/10* (2013.01)

(58) Field of Classification Search
CPC .. B60R 16/0207; B60R 16/0215; H05K 5/02; H02G 3/0462; H02G 3/10; H02G 3/0487; E05Y 2900/531
See application file for complete search history.

(56) References Cited

U.S. PATENT DOCUMENTS 6,657,869 B1    12/2003  Linke et al.

FOREIGN PATENT DOCUMENTS

JP    S6440223 U      3/1989
JP    2002539027 A   11/2002
JP    2010017026 A    1/2010

OTHER PUBLICATIONS

International Search Report for Application No. PCT/JP2015/081314 dated Feb. 2, 2016; 4 pages.

*Primary Examiner* — D Glenn Dayoan
*Assistant Examiner* — Melissa A Black
(74) *Attorney, Agent, or Firm* — Reising Ethington, P.C.

(57) ABSTRACT

An attachment member includes a bracket that has plate-like attachment portions, locking holes that penetrate the respective plate-like attachment portions, flexible locking pieces formed along opening edges of the respective locking holes, bend-allowing holes that allow the respective flexible locking pieces to elastically bend so as to expand the opening area of the respective locking holes, assembly members configured to be joined to the bracket so as to cover the respective plate-like attachment portions, locking fit-in portions formed in the respective assembly members and are configured to be fitted into the respective locking holes, and locking projections formed at the respective locking fit-in portions and are engageable with the respective flexible locking pieces.

6 Claims, 17 Drawing Sheets

ATTACHMENT MEMBER FOR WIRE GUIDING DEVICE

TECHNICAL FIELD

The present invention relates to an attachment member for a wire guiding device.

BACKGROUND ART

Patent Document 1 (JP2010-017026A) discloses a wire guiding device that is elongated and flexible and that is routed between a vehicle body and a sliding door of an automobile. A vehicle body-side terminal portion of the wire guiding device is coupled to a bracket within an accommodation space below a step. The accommodation space is open on a lateral side surface-side of the vehicle body, and a gap is unavoidably created between an opening edge of this opening portion and an outer circumference of the wire guiding device. This gap causes the problem of wind noise during driving of the automobile.

SUMMARY

As a countermeasure against wind noise, it is possible to attach a cover to the bracket and block the gap of the opening portion of the accommodation space with this cover. In this case, as a locking means for holding the bracket and the cover in an attached state, a structure is conceivable in which engagement portions respectively formed on an outside surface of the bracket and an outer edge portion of the cover are engaged with each other. However, if the engagement portions protrude from the outside surface of the bracket and the outer edge portion of the cover, the sizes of the bracket and the cover increase, which makes it difficult to accommodate the bracket and the cover within a limited space.

The present disclosure was made based on circumstances such as those described above, and it is an object thereof to save space.

According to one embodiment, the present disclosure may include:
- a bracket that is configured to be fixed to a vehicle body or a sliding door;
- a plate-like attachment portion that is formed on an outer surface of the bracket;
- a locking hole that is formed in the plate-like attachment portion and extends in a plate thickness direction of the plate-like attachment portion;
- a flexible locking piece that is formed along an opening edge of the locking hole;
- a bend-allowing hole that is formed in the plate-like attachment portion, the bend-allowing hole being disposed so as to sandwich the flexible locking piece between the locking hole and the bend-allowing hole, and allowing the flexible locking piece to elastically bend so as to expand an opening area of the locking hole;
- an assembly member that is configured to be joined to the bracket so as to cover an outer surface of the plate-like attachment portion;
- a locking fit-in portion that is formed in the assembly member and is configured to be fitted into the locking hole; and
- a locking projection that is formed at the locking fit-in portion and is engageable with the flexible locking piece in a state in which the locking fit-in portion is fitted into the locking hole.

When joining the assembly member to the bracket, the locking fit-in portion is fitted into the locking hole while elastically bending the flexible locking piece toward the bend-allowing hole with the locking projection. Then, when the locking projection has passed the flexible locking piece, the flexible locking piece elastically returns and engages with the locking projection. Due to the effect of this engagement, the assembly member is locked in a state in which it is joined to the bracket. The locking hole, the flexible locking piece, and the bend-allowing hole, which serve as means for locking the bracket and the assembly member in the joined state, do not protrude from the outer surface of the bracket, but rather are formed within the range of the plate-like attachment portion on the outer surface of the bracket. Thus, an increase in size can be avoided.

DESCRIPTION OF EMBODIMENTS

Figure 1:
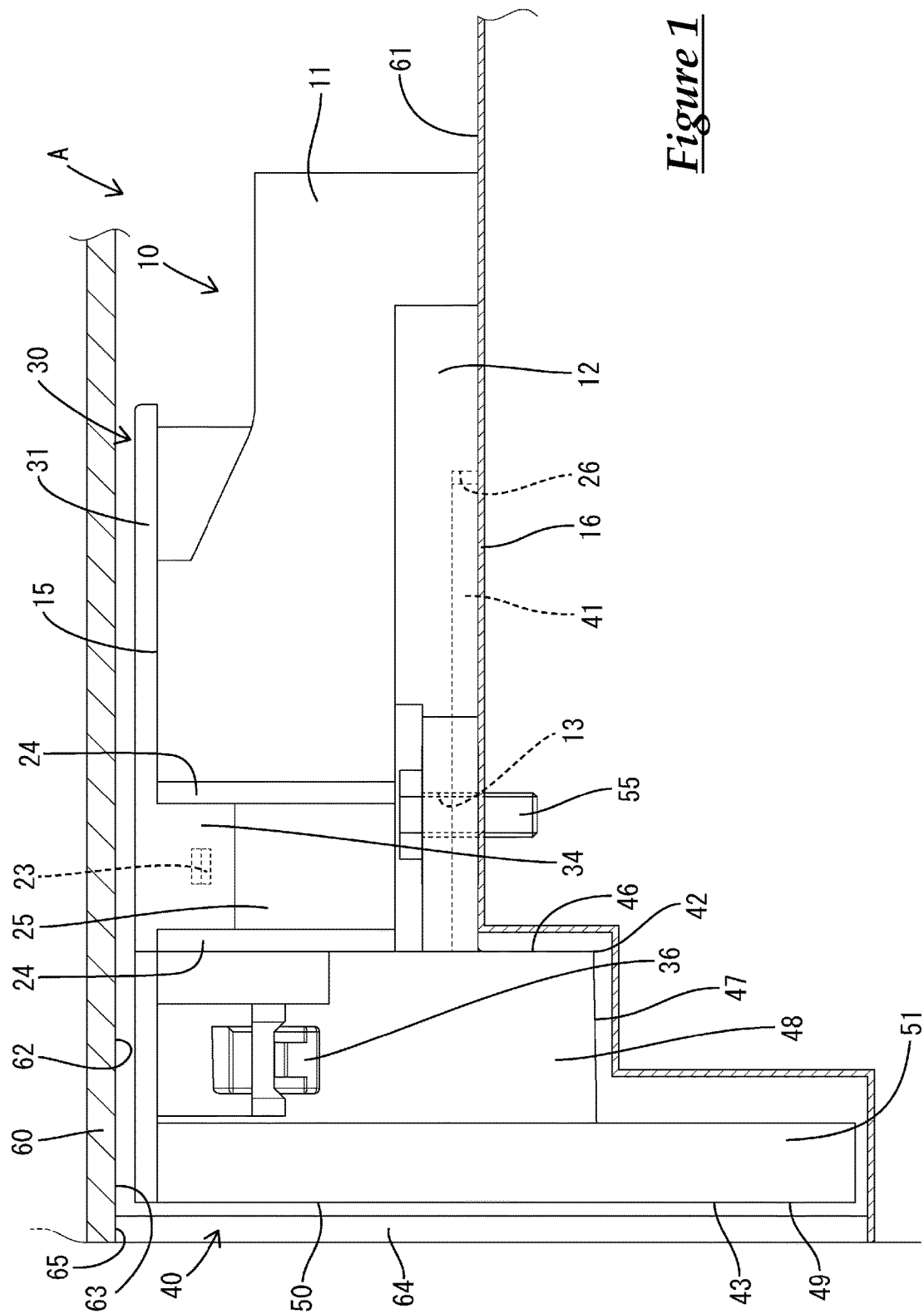
FIG. 1 is a partially cut-away side view showing a state in which an attachment member of Embodiment 1 is attached to a vehicle body.

The present disclosure may also have a configuration in which the flexible locking piece has an elongated continuous shape, and with respect to a length direction of the flexible locking piece, a formation region of the bend-allowing hole extends over a larger range than a formation region of the locking hole.

The technical reasons for this configuration are as follows. The flexible locking piece is deformed and curved when elastically bent. Of both side edge portions of the flexible locking piece that extend along the length direction of the flexible locking piece, the radially inner side of the curvature faces the locking hole, and the radially outer side of the curvature faces the bend-allowing hole. Focusing on this point, the formation region of the bend-allowing hole is set to extend over a larger range than the formation region of the locking hole. Thus, it is easy for the flexible locking piece to deform toward the bend-allowing hole, and therefore, the resistance that is generated when the locking projection causes the flexible locking piece to elastically bend can be reduced to a low level.

The present disclosure may also have a configuration in which the flexible locking piece has an elongated continuous shape, and, with respect to a length direction of the flexible locking piece, a formation region of the locking projection extends over a smaller range than a formation region of the locking fit-in portion, and the locking projection is disposed at a substantially central portion of the locking fit-in portion.

With this configuration, the locking projection comes into contact with the flexible locking piece only at a position that is located in a substantially central portion of the flexible locking piece with respect to the length direction where the amount of elastic displacement is largest. Therefore, the resistance that is applied to the locking projection when the flexible locking piece elastically bends can be reduced to a low level.

The present disclosure may also include a sliding contact surface that is formed on the outer surface of the bracket and is at a substantially right angle to a plate surface of the plate-like attachment portion, a guiding portion that is formed on the sliding contact surface and extends in a direction that is at a substantially right angle to the plate surface of the plate-like attachment portion, and a sliding contact portion that is formed in the assembly member and can be brought into sliding contact with the sliding contact surface and the guiding portion.

With this configuration, when joining the assembly member to the bracket, the locking hole is hidden by the assembly member, and therefore it is difficult to align the locking fit-in portion with the locking hole while performing visual observation. However, with this configuration, it is possible to align the sliding contact portion of the assembly member with the sliding contact surface and the guiding portion, which are formed on the outer surface of the bracket, while visually observing these elements, and thus, the locking fit-in portion can be reliably fitted into the locking hole.

The present disclosure may also have a configuration in which a positioning recess in which the assembly member is to be positioned and accommodated is formed in an outer surface of the plate-like attachment portion.

With this configuration, when joining the assembly member to the bracket, the assembly member can be positioned relative to the bracket.

The present disclosure may also have a configuration in which the bracket is configured to be accommodated in an accommodation space that is provided below a step of the vehicle body, and a covering portion configured to cover an opening portion of the accommodation space is formed in the assembly member.

With this configuration, wind noise while driving can be reduced by covering the opening portion of the accommodation space.

Embodiment 1

Figure 20:
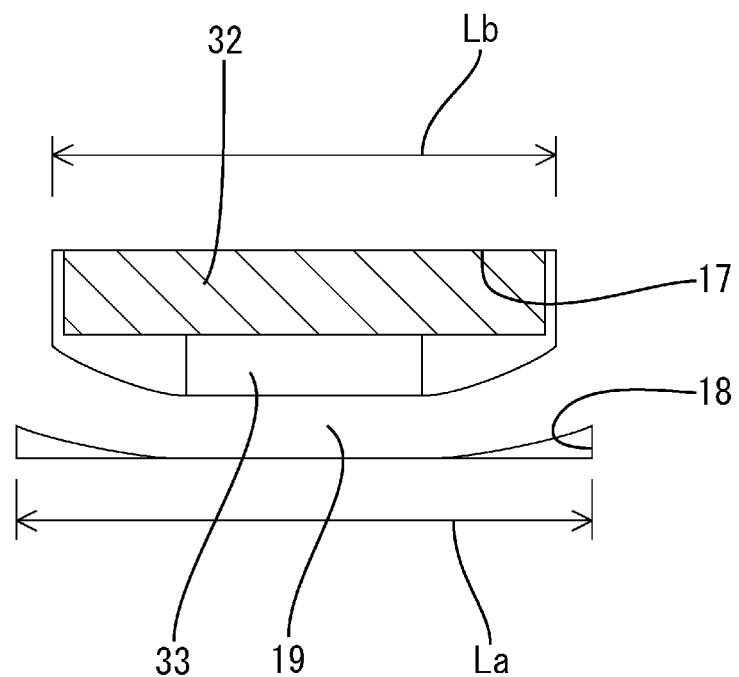
FIG. 20 is an enlarged partial plan view showing a state in which, during the process of fitting the first locking fit-in portion into the first locking hole, the first flexible locking piece is elastically bent.
Figure 21:
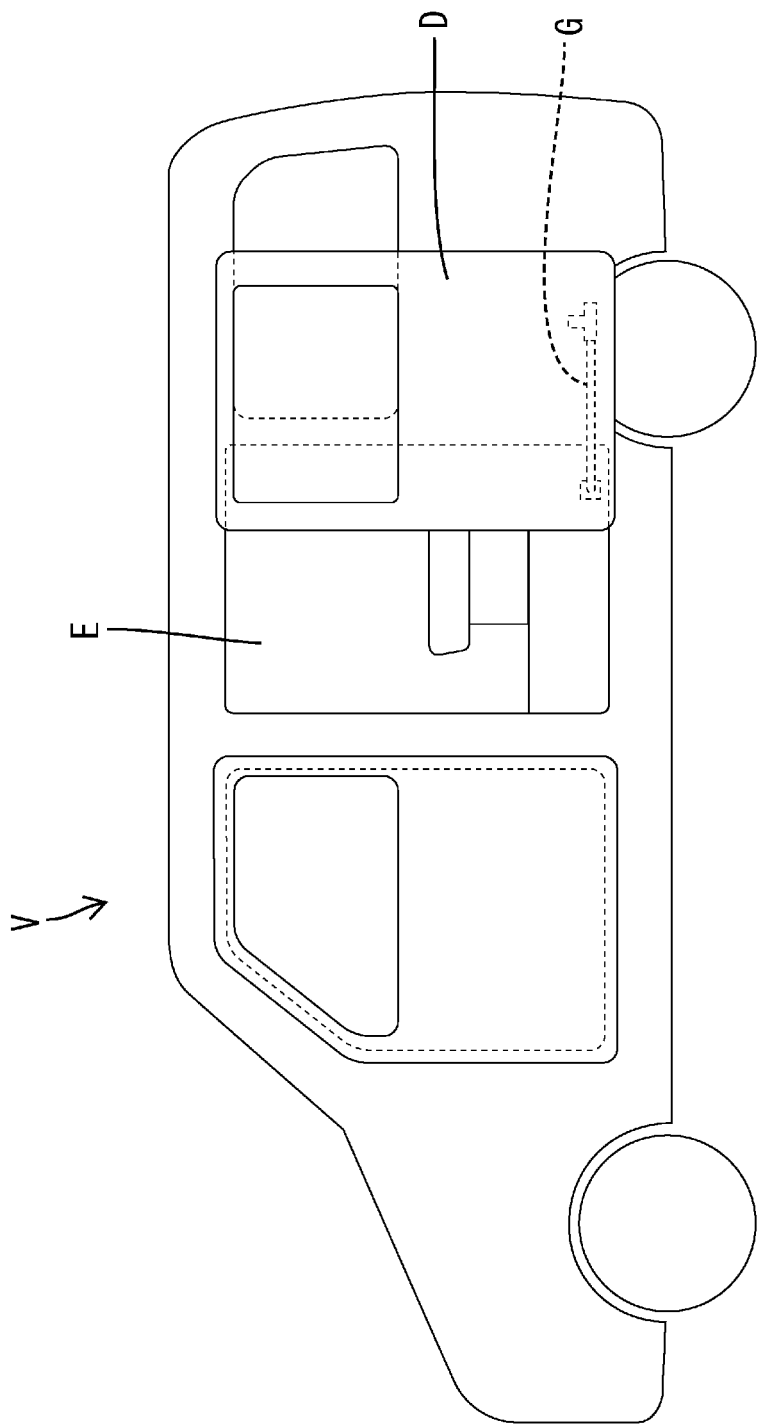
FIG. 21 is a side view of an automobile to which the attachment member of an embodiment of the present disclosure is applicable.

Hereinafter, Embodiment 1 of the present disclosure will be described with reference to FIGS. 1 to 22. FIG. 21 shows an automobile V to which an attachment member A of Embodiment 1 is attachable. An entrance/exit E in a side face of a vehicle body B of the automobile V is configured to be opened and closed by a sliding door D. An elongated and flexible wire guiding device G for supplying power, for example, to a piece of electrical equipment provided in the sliding door D extends between the vehicle body B and the sliding door D. The wire guiding device G has a well-known form in which a wire harness (not shown) is enclosed with a tubular sheathing member. The attachment member A of Embodiment 1 functions as a means for fixing one end portion of the wire guiding device G to the vehicle body B.

Figure 2:
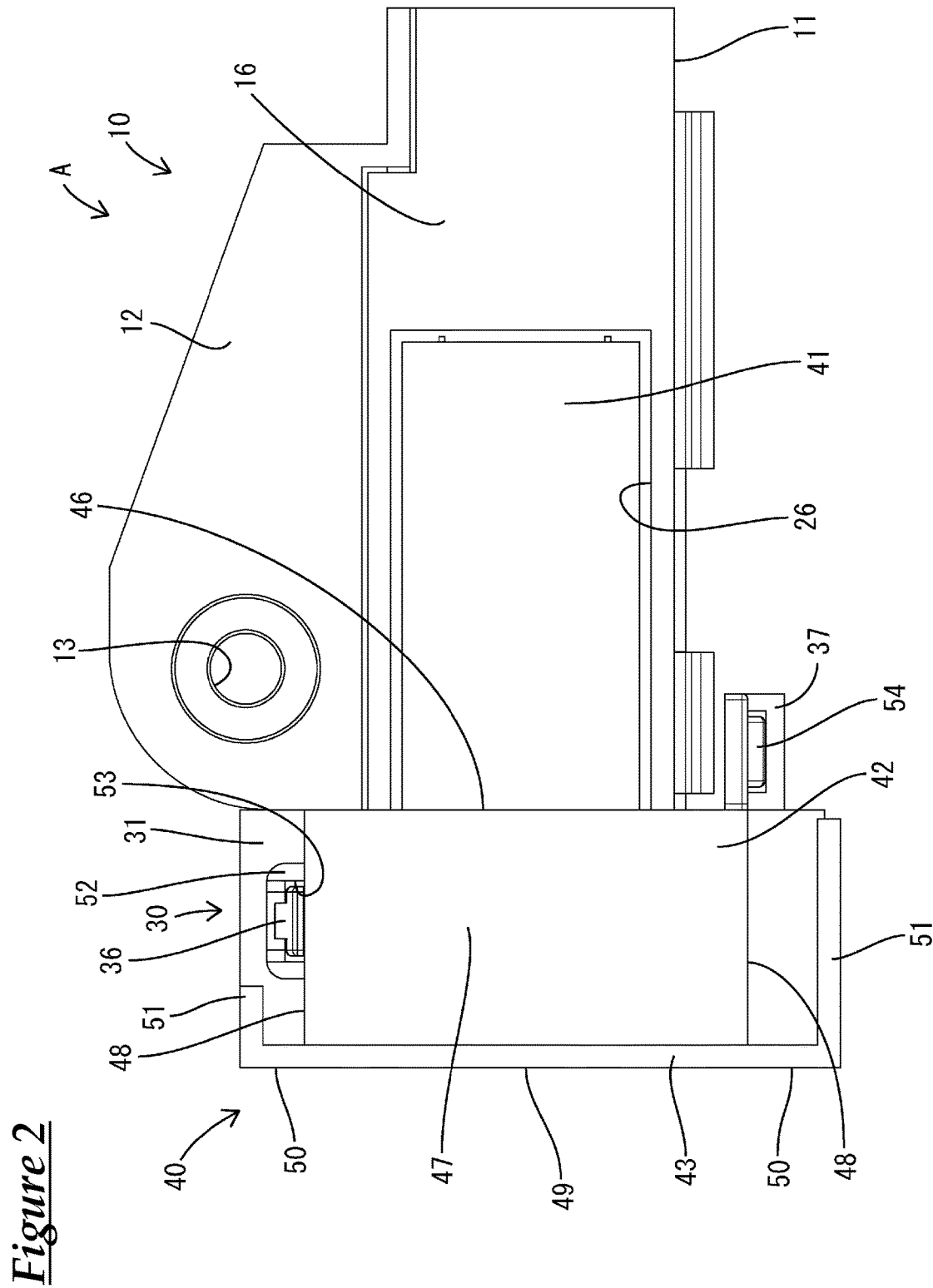
FIG. 2 is a bottom view of the attachment member.
Figure 3:
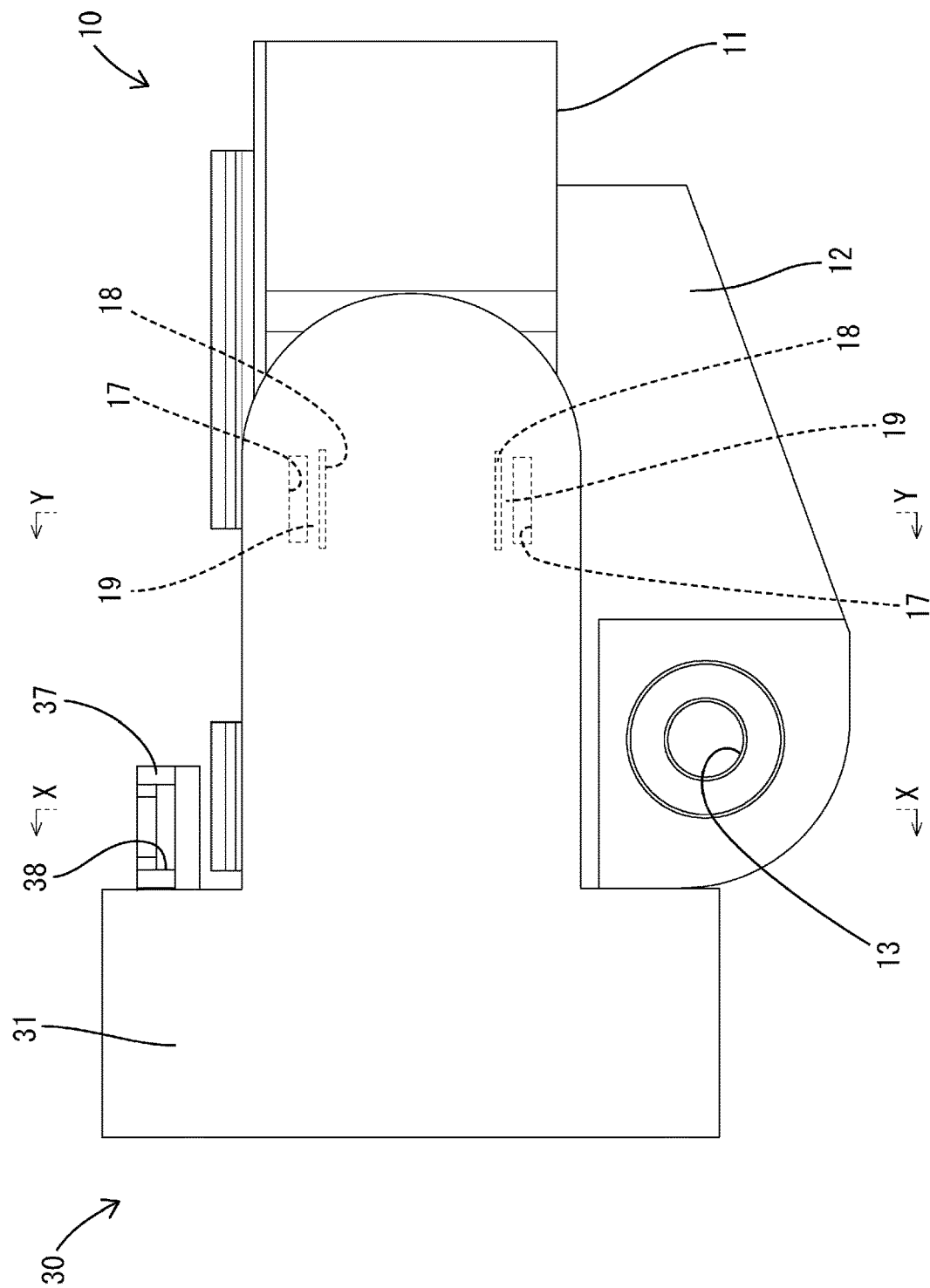
FIG. 3 is a plan view showing a state in which an upper member is joined to a bracket.
Figure 7:
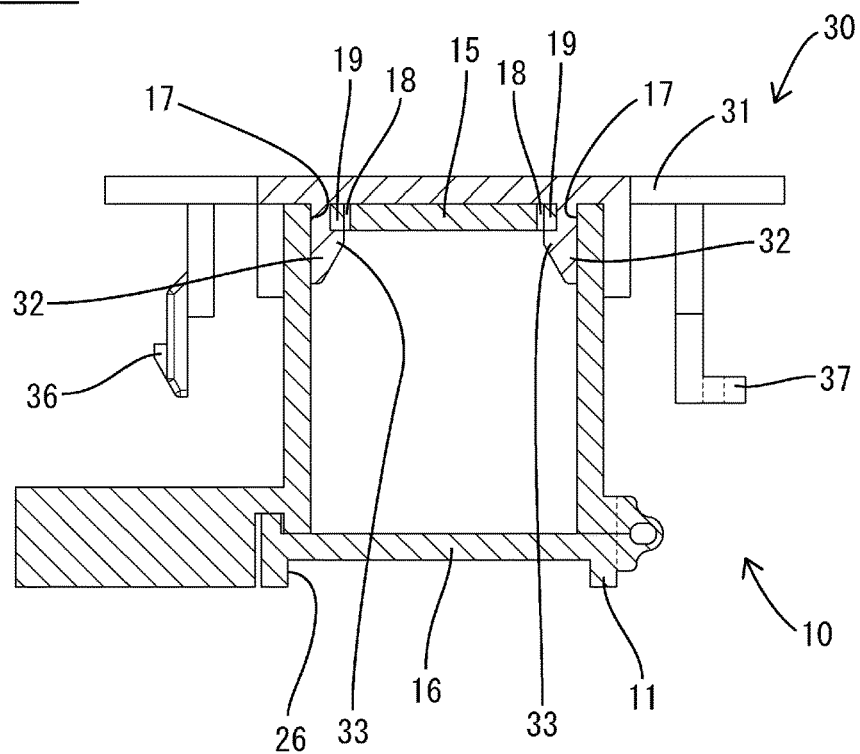
FIG. 7 is a cross-sectional view taken along line Y-Y in FIG. 3.
Figure 8:
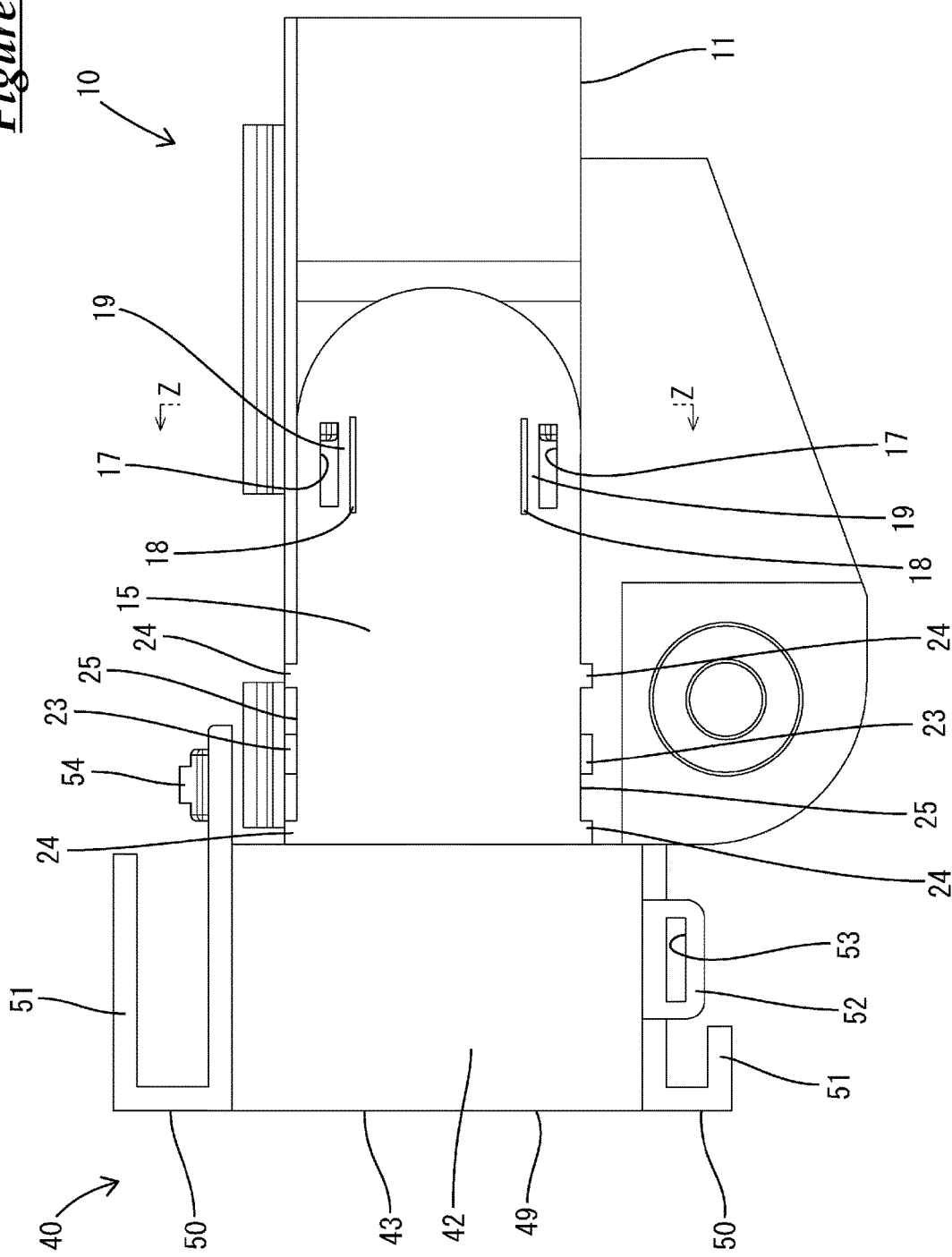
FIG. 8 is a plan view showing a state in which a lower member is joined to the bracket.

The attachment member A includes a bracket 10 made of a synthetic resin, an upper member 30 (assembly member stated in the claims) made of a synthetic resin, and a lower member 40 (assembly member stated in the claims) made of a synthetic resin. It should be noted that, in the following description regarding the attachment member A, with respect to a front-rear direction, the left side in FIGS. 1 to 3, 5, and 8 is defined as the front side. With respect to an up-down direction, the upper and lower sides shown in FIGS. 1, 4 to 7, 9 to 11, and 15 are defined as the upper side and the lower side, respectively, as-is. With respect to a left-right direction, the lower side in FIG. 2 and the upper side in FIGS. 3 and 8 are defined as the right side.

Figure 10:
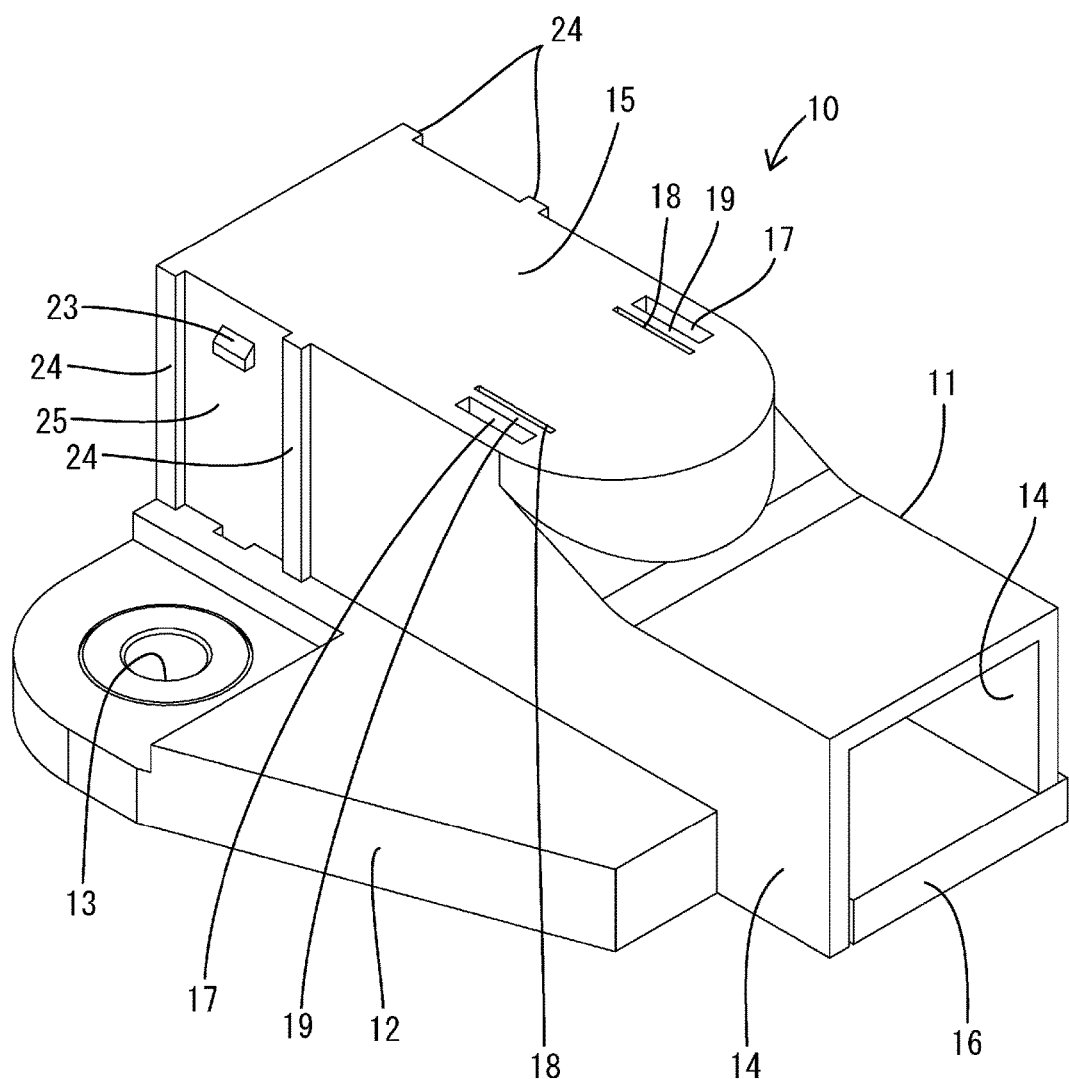
FIG. 10 is a perspective view of the bracket.

As shown in FIG. 10, the bracket 10 includes a rectangular tube portion 11 that penetrates the bracket 10 in the front-rear direction and a protruding portion 12 that protrudes horizontally leftward from a lower end portion of a left side surface of the rectangular tube portion 11. A bolt hole 13 is formed penetrating the protruding portion 12 in the up-down direction. The rectangular tube portion 11 includes left and right side wall portions 14, a horizontal first plate-like attachment portion 15 that connects upper ends of the two side wall portions 14 to each other, and a second plate-like attachment portion 16 that connects lower ends of the two side wall portions 14 to each other.

Figure 19:
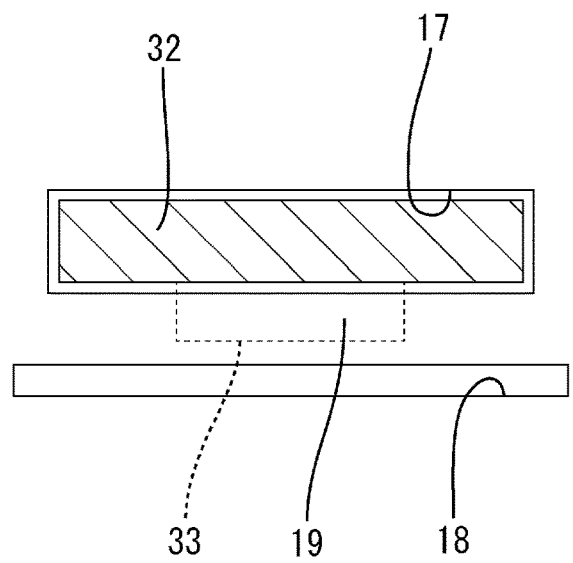
FIG. 19 is an enlarged partial plan view showing a state in which a first locking fit-in portion is fitted in a first locking hole, and a first locking projection is engaged with a first flexible locking piece.

A pair of symmetrical left and right first locking holes 17, a pair of symmetrical left and right first bend-allowing holes 18, and a pair of symmetrical left and right first flexible locking pieces 19 are formed in the first plate-like attachment portion 15. The first locking holes 17 penetrate the first plate-like attachment portion 15 in its plate thickness direction (up-down direction). As shown in FIGS. 8 and 19, the first locking holes 17 each have a slit-like rectangular shape (opening shape) that is elongated in the front-rear direction in plan view.

As is the case with the first locking holes 17, the first bend-allowing holes 18 also penetrate the first plate-like attachment portion 15 in the plate thickness direction (up-down direction) thereof. The first bend-allowing holes 18 are disposed such that each of the first bend-allowing holes 18 and a corresponding one of the first locking holes 17 extend abreast. As is the case with the first locking holes 17, the first bend-allowing holes 18 also each have a slit-like rectangular shape (opening shape) that is elongated in the front-rear direction in plan view.

The first flexible locking pieces 19 are each disposed between a corresponding one of the first locking holes 17 and a corresponding one of the first bend-allowing holes 18. The first flexible locking pieces 19 each have a shape that is elongated in the front-rear direction along an inner side edge of a corresponding one of the first locking holes 17 and an inner side edge of a corresponding one of the first bend-allowing holes 18 in plan view. The first flexible locking pieces 19 are each supported by and continuous with the first plate-like attachment portion 15 at both of the front and rear end portions. As shown in FIG. 20, each first flexible locking piece 19 can be elastically deformed and curved so as to bulge toward the first bend-allowing hole 18. When the first flexible locking piece 19 is elastically bent, the amount of displacement in the left-right direction is largest at the central portion with respect to the front-rear direction.

As shown in FIGS. 19 and 20, with respect to the length direction of the first flexible locking pieces 19, a front-rear length La (formation region) of the first bend-allowing holes 18 is longer than a front-rear length Lb (formation region) of the first locking holes 17. Moreover, front ends of the first bend-allowing holes 18 are located forward of front ends of the respective first locking holes 17, and rear ends of the respective first bend-allowing holes 18 are located rearward of rear ends of the respective first locking holes 17.

Figure 9:
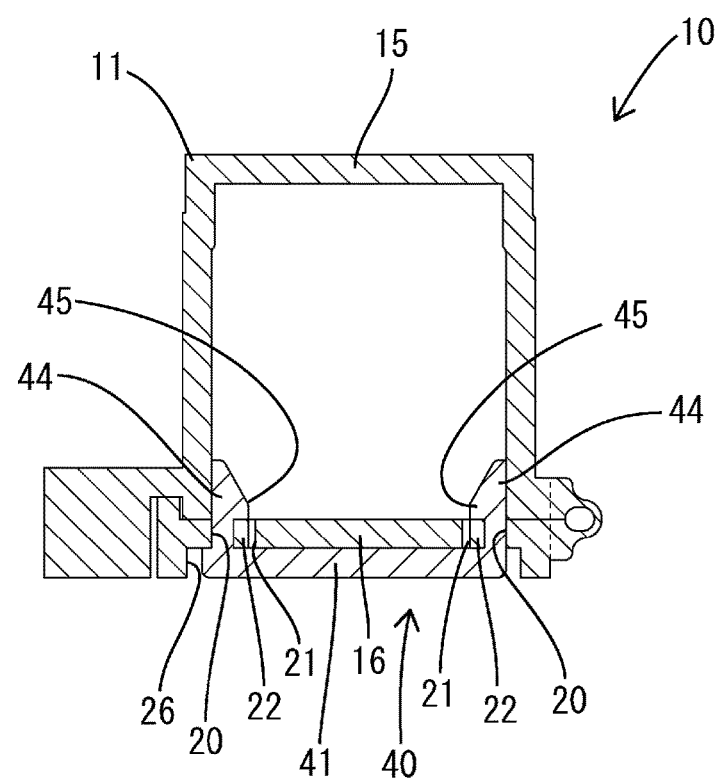
FIG. 9 is a cross-sectional view taken along line Z-Z in FIG. 8.

As shown in FIG. 9, a pair of symmetrical left and right second locking holes 20, a pair of symmetrical left and right second bend-allowing holes 21, and a pair of symmetrical left and right second flexible locking pieces 22 that are similar to those of the first plate-like attachment portion 15 are also formed in the second plate-like attachment portion 16. The opening shapes, positional relationship, dimensional relationship, and the like of the second locking holes 20, the second bend-allowing holes 21, and the second flexible locking pieces 22 are the same as those of the first locking holes 17, the first bend-allowing holes 18, and the first flexible locking pieces 19, and therefore, their description is omitted.

A pair of symmetrical left and right first engagement projections 23 are formed at front end portions of the left and right side wall portions 14 of the bracket 10. Also, a pair of front and rear guiding portions 24 each extending in the up-down direction and protruding in a rib-like shape are formed at the front end portion of each of the left and right side wall portions 14 of the bracket 10 so as to sandwich the corresponding first engagement projection 23 from the front side and the rear side. A region of an outer surface of each of the left and right side wall portion 14 of the bracket 10 which is sandwiched between the pair of front and rear guiding portions 24 and in which the first engagement projection 23 is disposed constitutes a sliding contact surface 25. Moreover, as shown in FIGS. 1 and 2, a positioning recess 26 is formed in a lower surface (outer surface) of the second plate-like attachment portion 16. The positioning recess 26 is open in a front end surface of the bracket 10 (second plate-like attachment portion 16).

Figure 11:
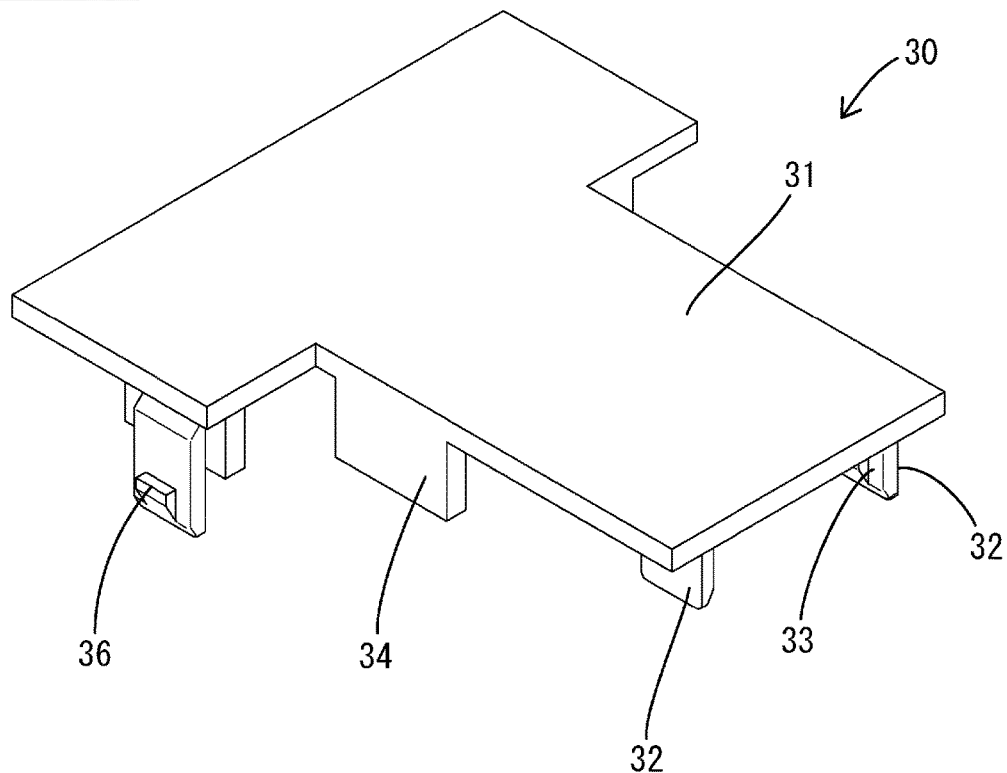
FIG. 11 is a perspective view of the upper member.
Figure 12:
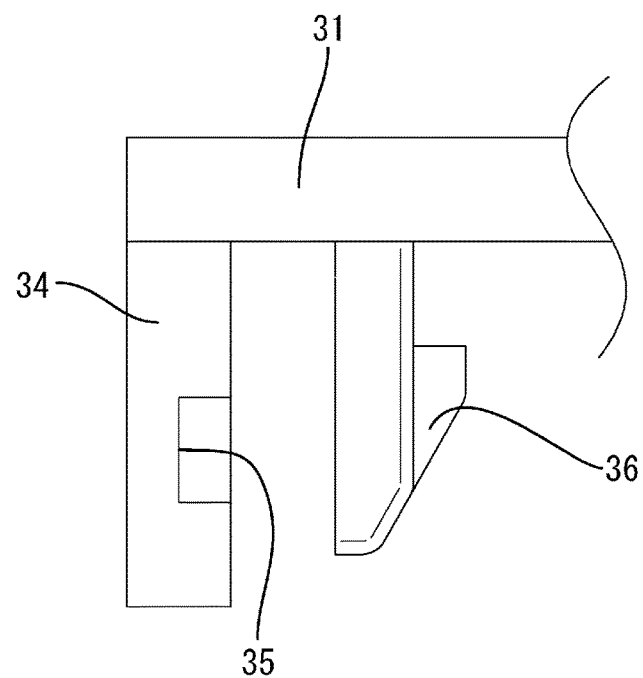
FIG. 12 is a partial front view of the upper member.

As shown in FIG. 11, the upper member 30 is a one-piece component having a horizontal plate-like main body portion 31. The plate-like main body portion 31 is substantially T-shaped in plan view, with the width dimension of its front end-side region being larger than the width dimension of its rear end-side region. As shown in FIG. 7, a pair of symmetrical left and right plate-like first locking fit-in portions 32 protrude downward from a lower surface of a rear end portion of the plate-like main body portion 31. The first locking fit-in portions 32 are disposed such that their plate thickness direction matches the left-right direction.

Figure 14:
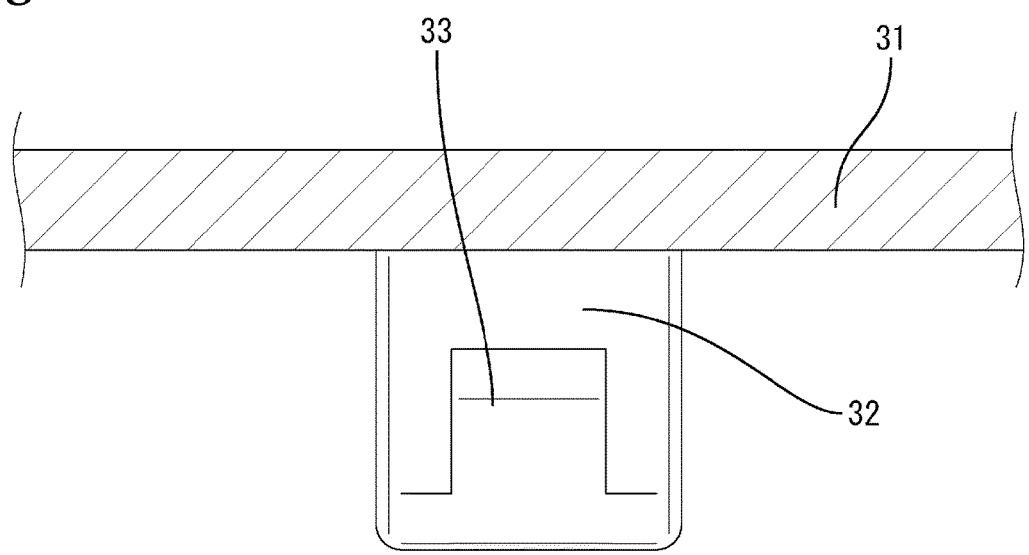
FIG. 14 is a side view showing a locking fit-in portion and a locking projection of the upper member when viewed from the inner surface side.

A pair of symmetrical left and right first locking projections 33 are formed at respective inner surfaces of the left and right first locking fit-in portions 32. As shown in FIGS. 14, 19, and 20, the formation range of the first locking projections 33 with respect to the front-rear direction (width direction of the locking fit-in portions) is smaller than the formation range of the locking fit-in portions. Moreover, each first locking projection 33 is disposed at a central portion of a corresponding one of the locking fit-in portions with respect to the front-rear direction.

Figure 4:
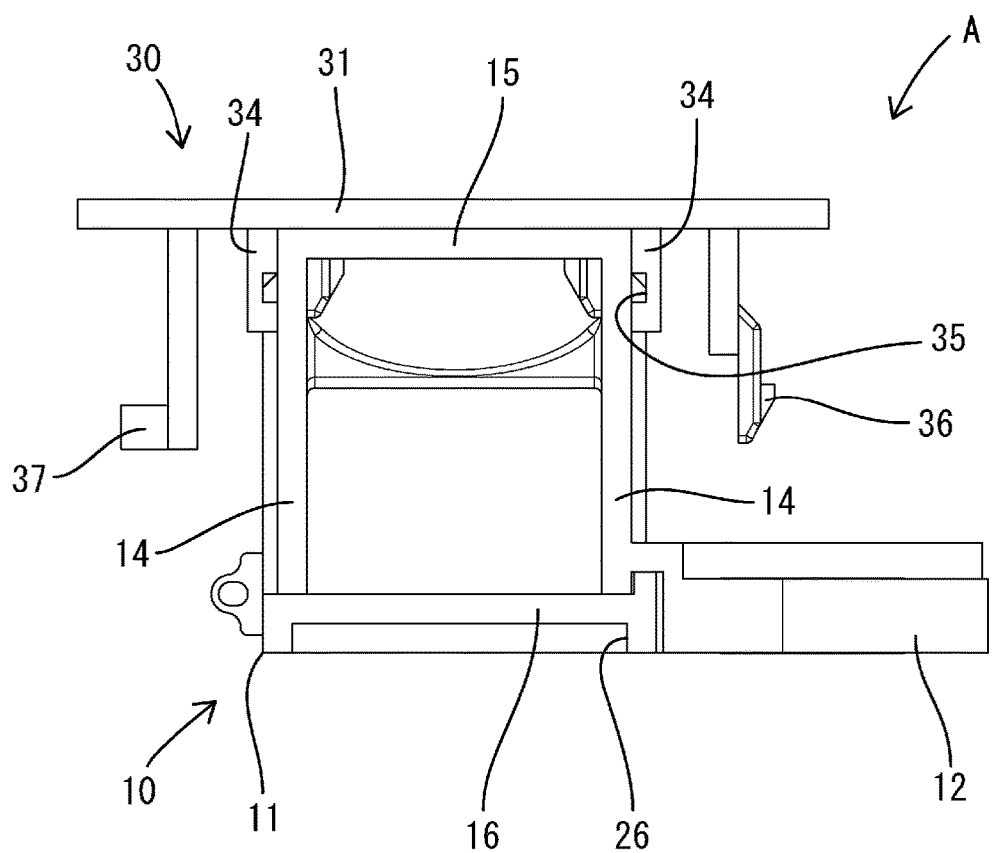
FIG. 4 is a front view showing the state in which the upper member is joined to the bracket.
Figure 5:
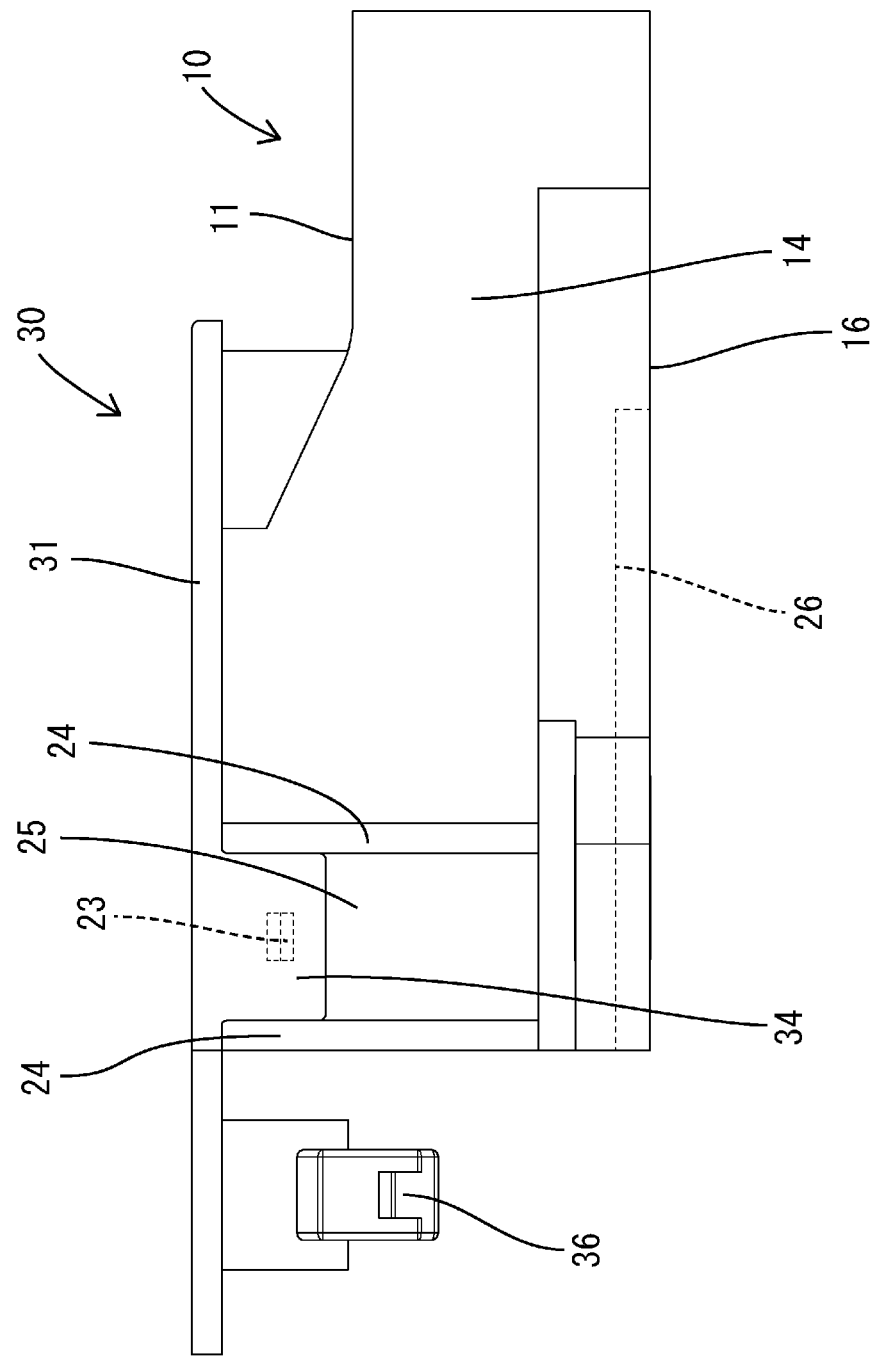
FIG. 5 is a side view showing the state in which the upper member is joined to the bracket.
Figure 6:
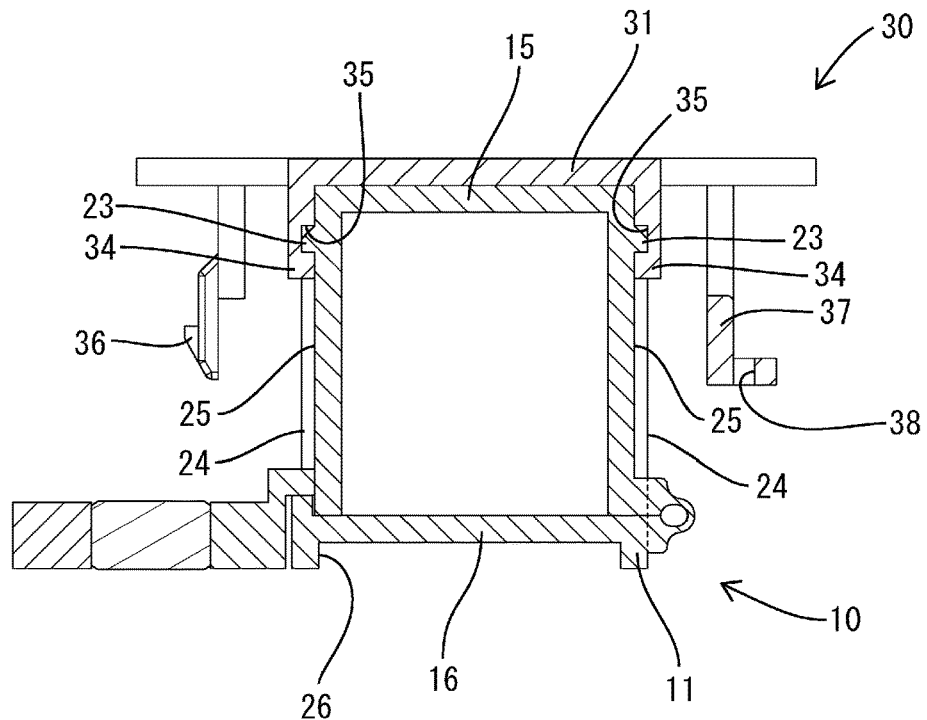
FIG. 6 is a cross-sectional view taken along line X-X in FIG. 3.
Figure 13:
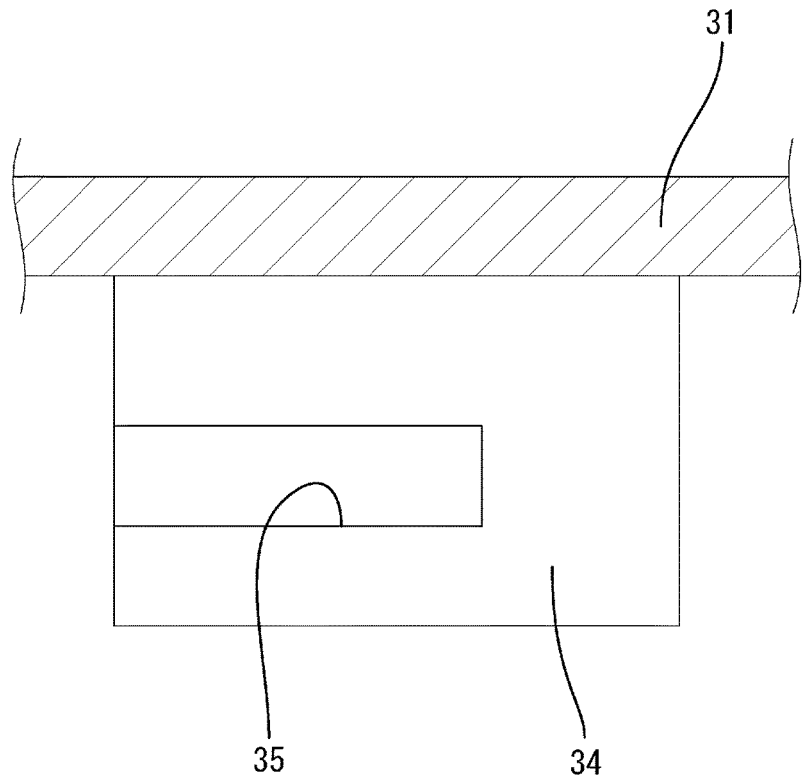
FIG. 13 is a side view showing a sliding contact portion of the upper member when viewed from an inner surface side.

As shown in FIGS. 6 and 11, a pair of symmetrical left and right sliding contact portions 34 are formed at left and right side edge portions in a substantially central portion of the plate-like main body portion 31 with respect to the front-rear direction. The sliding contact portions 34 are flat plate-shaped and protrude downward such that their plate thickness direction matches the left-right direction. As shown in FIG. 13, a groove-like first engagement portion 35 is formed in an inner side surface of each sliding contact portion 34. The groove of each first engagement portion 35 is open in a front end surface of the sliding contact portion 34 at a front end and is closed like a cul-de-sac at a rear end. As shown in FIGS. 4, 5, and 11, a second engagement projection 36 protruding downward is formed at a left end portion in a front end portion of the plate-like main body portion 31. Moreover, as shown in FIG. 3, a third engagement portion 37 is formed at a right end portion in the front end portion of the plate-like main body portion 31. A third engagement hole 38 is formed penetrating the third engagement portion 37 in the up-down direction.

Figure 15:
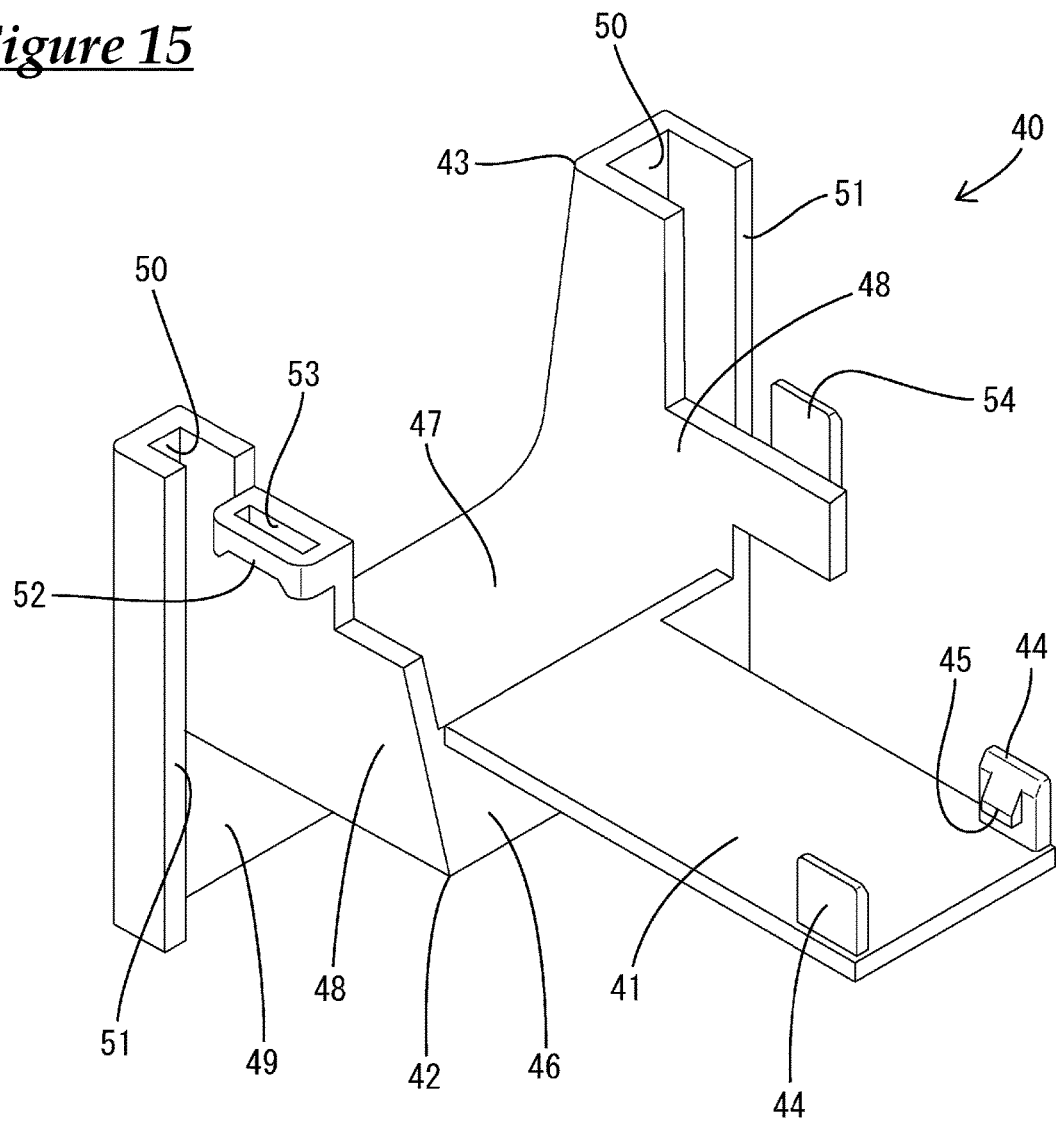
FIG. 15 is a perspective view of the lower member.
Figure 16:
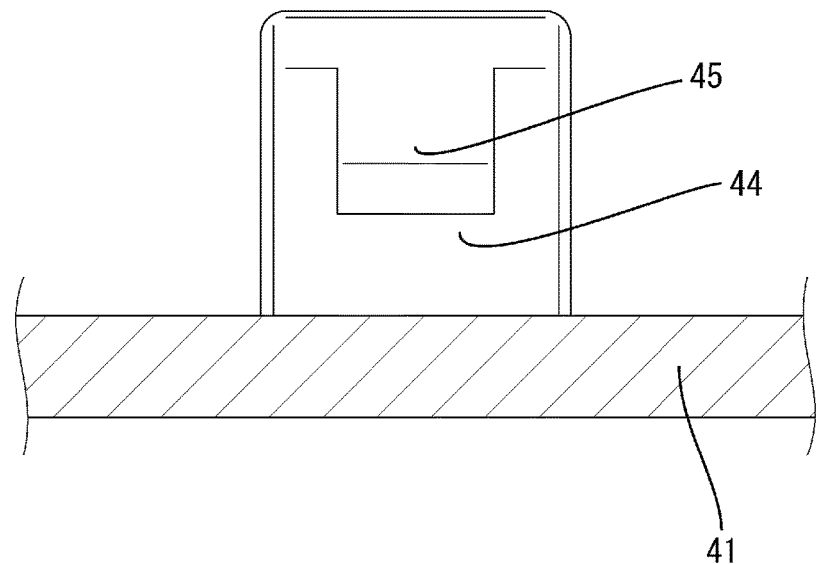
FIG. 16 is a side view showing a locking fit-in portion and a locking projection of the lower member when viewed from an inner surface side.
Figure 17:
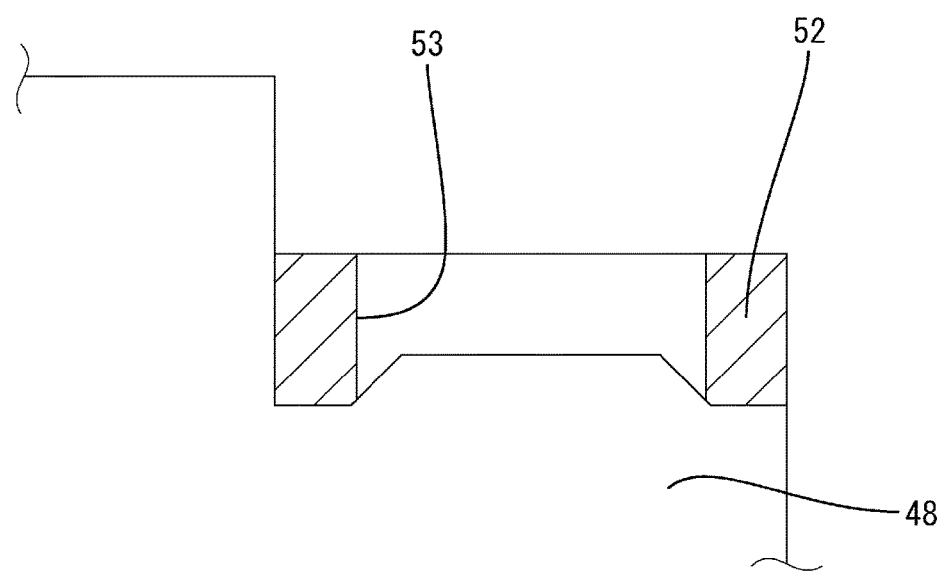
FIG. 17 is a cross-sectional view of a second engagement portion of the lower member.
Figure 18:
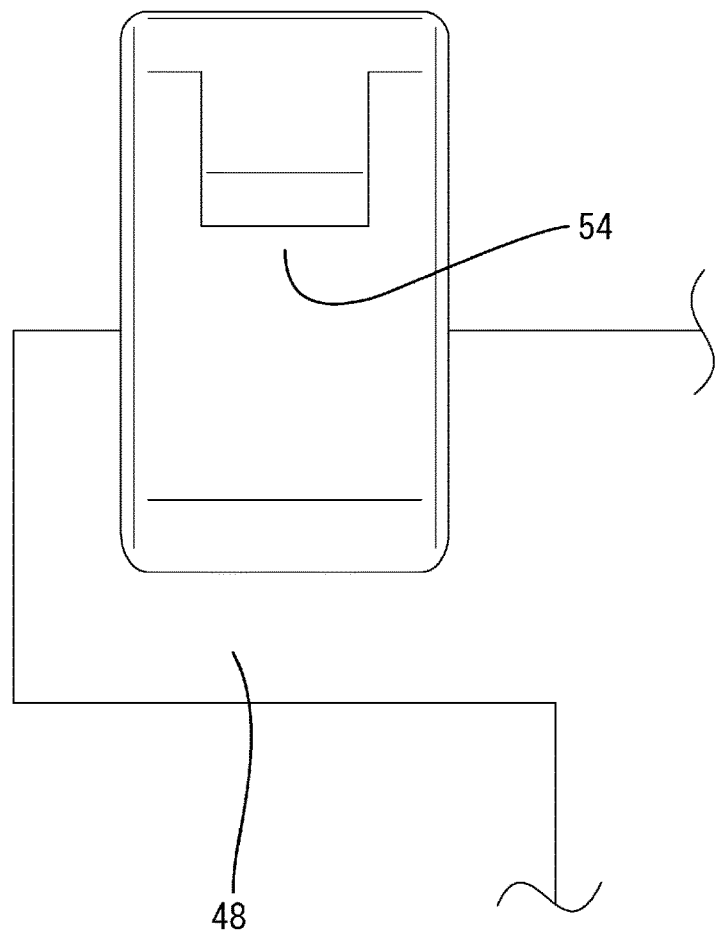
FIG. 18 is a side view showing a third engagement projection of the lower member when viewed from an outer surface side.

As shown in FIG. 15, the lower member 40 includes a horizontal substrate portion 41 having a quadrangular shape in plan view, a step portion 42 that extends continuously from a front end edge of the substrate portion 41, and a covering portion 43 that extends continuously from a front end edge of the step portion 42. A pair of symmetrical left and right second locking fit-in portions 44 and a pair of symmetrical left and right second locking projections 45 protruding from inner side surfaces of the respective second locking fit-in portions 44 are formed at a rear end portion of an upper surface of the substrate portion 41. The second locking fit-in portions 44 and the second locking projections 45 have a form obtained by inverting the first locking fit-in portions 32 and the first locking projections 33, which have been described above, and therefore, their detailed description is omitted.

The step portion 42 is constituted by a rear surface plate 46 extending downward from the front end edge of the substrate portion 41, a lower surface plate 47 extending forward from a lower end edge of the rear surface plate 46, and a pair of left and right side surface plates 48 extending continuously from left and right side edges of the rear surface plate 46 and left and right side edges of the lower surface plate 47. The covering portion 43 is constituted by a lower covering plate 49 protruding downward from the front end edge of the lower surface plate 47 and a pair of left and right side covering plates 50 protruding laterally outward from left and right side edges, respectively, and having a plate-like shape. Reinforcement ribs 51 are formed protruding rearward from outer edges of the respective side covering plates with respect to the left-right direction.

A second engagement portion 52 is formed on the side surface plate 48 that is located on the left side of the step portion 42, the second engagement portion 52 protruding outward from an upper end edge of that side surface plate 48 with respect to the left-right direction. A second engagement hole 53 is formed penetrating the second engagement portion 52 in the up-down direction. A third engagement projection 54 is formed on the side surface plate 48 that is located on the right side of the step portion 42, the third engagement projection 54 protruding upward from an upper end edge of that side surface plate 48.

Procedures for Assembling Attachment Member A

It does not matter which of the upper member 30 and the lower member 40 is joined to the bracket 10 first. To begin with, procedures for joining the upper member 30 to the bracket 10 will be described. The upper member 30 is brought close to the bracket 10 in such a manner that the plate-like main body portion 31 is placed over an upper surface of the first plate-like attachment portion 15 from above the bracket 10. At this time, the bracket 10 is held between the left and right sliding contact portions 34, the inner surfaces of the two sliding contact portions 34 are brought into sliding contact with the respective sliding contact surfaces 25 of the bracket 10, and the front and rear side edges of each of the two sliding contact surfaces 25 are brought into sliding contact with the corresponding pair of front and rear guiding portions 24, respectively. Due to the effect of the above-described sliding contact, the upper member 30 is positioned relative to the bracket 10 with respect to the front-rear direction and the left-right direction.

Since the plate-like main body portion 31 of the upper member 30 is joined in such a manner as to cover the first plate-like attachment portion 15 of the bracket 10, it is difficult for a worker to visually check the positions of the first locking holes 17. However, if the sliding contact surfaces 25, the guiding portions 24, and the sliding contact portions 34 are aligned while being visually observed, the pair of first locking fit-in portions 32 are positioned relative to the pair of first locking holes 17.

When joining of the upper member 30 to the bracket 10 is further advanced, the first locking fit-in portions 32 are fitted into the respective first locking holes 17. Here, the front-rear dimension and the left-right dimension of the first locking fit-in portions 32 are equal to or slightly smaller than the front-rear dimension and the left-right dimension, respectively, of the first locking holes 17. Accordingly, the first locking projections 33 cause the respective first flexible locking pieces 19 to elastically bend in such a manner as to push the first flexible locking pieces 19 toward the respective first bend-allowing holes 18.

At this time, although the first flexible locking pieces 19 are deformed and curved as shown in FIG. 20, since the front-rear dimension of the first locking projections 33 is shorter than the front-rear length of the first flexible locking pieces 19, the first locking projections 33 come into contact with the respective first flexible locking pieces 19 at only the central portions of the first flexible locking pieces 19 with respect to the front-rear direction, that is, only the regions where the amount of elastic bend of the first flexible locking pieces 19 is largest. In other words, front and rear end portions of the first flexible locking pieces 19 where the amount of elastic bend is small are not pressed against by the first locking projections 33, and thus, the frictional resistance that is generated between each first flexible locking piece 19 and the corresponding first locking projection 33 is reduced.

Moreover, with regard to the length of each first flexible locking piece 19 in the front-rear direction, the overall length (i.e., front-rear dimension La of the first bend-allowing hole 18) of a side edge that is located on the radially outer side when the first flexible locking piece 19 is deformed and curved is longer than the overall length (i.e., front-rear dimension Lb of the first locking hole 17) of a side edge that is located on the radially inner side when the first flexible locking piece 19 is deformed and curved. Thus, each first flexible locking piece 19 can elastically bend over the entire length thereof, and therefore, the frictional resistance that is generated between each first flexible locking piece 19 and the corresponding first locking projection 33 is reduced.

When the upper member 30 reaches a properly joined state, the first locking projections 33 have passed the respective first flexible locking pieces 19, and therefore, as shown in FIG. 19, the first flexible locking pieces 19 elastically return and engage with the respective first locking projections 33. Moreover, in the properly joined state, the groove-like first engagement portions 35 in the sliding contact portions 34 engage with the respective first engagement projections 23. The above-described engagement restricts displacement of the upper member 30 in an upward direction (disengagement direction) relative to the bracket 10 and locks the upper member 30 in the joined state.

Next, procedures for joining the lower member 40 to the bracket 10 will be described. The lower member 40 is brought close to the bracket 10 in such a manner that the substrate portion 41 is placed under the lower surface of the second plate-like attachment portion 16 from below the bracket 10. At this time, the lower member 40 is positioned relative to the bracket 10 with respect to the front-rear direction and the left-right direction by fitting the substrate portion 41 into the positioning recess 26. Moreover, since the substrate portion 41 of the lower member 40 is joined in such a manner as to cover the second plate-like attachment portion 16, it is difficult for the worker to visually check the positions of the second locking holes 20. However, if the substrate portion 41 is aligned with the positioning recess 26, the pair of second locking fit-in portions 44 are positioned relative to the pair of second locking holes 20.

When joining of the lower member 40 to the bracket 10 is further advanced, the substrate portion 41 is accommodated in the positioning recess 26, and the second locking fit-in portions 44 are fitted into the respective second locking holes 20. In the process through which the second locking fit-in portions 44 are fitted into the respective second locking holes 20, the process through which the second locking projections 45 cause the respective second flexible locking pieces 22 to elastically bend, and the process through which the second flexible locking pieces 22 engage with the respective second locking projections 45, the same phenomena and effects as those in the case of the above-described upper member 30 are realized, and therefore, their description is omitted. Then, as a result of the second flexible locking pieces 22 engaging with the respective second locking projections 45, the lower member 40 is locked in a state in which it is joined to the bracket 10.

Moreover, when both the upper member 30 and the lower member 40 are properly joined to the bracket 10, the second engagement projection 36 of the upper member 30 engages with the second engagement portion 52 of the lower member 40, and the third engagement portion 37 of the upper member 30 engages with the third engagement projection 54 of the lower member 40. Due to the effect of the above-described engagement, disengagement of the upper member 30 and the lower member 40 in the upward and downward directions, respectively, is restricted with the bracket 10 held therebetween, and the upper member 30 and the lower member 40 are locked in a combined state.

The attachment member A that has been joined in the above-described manner is mounted on a base plate 61 for supporting a step 60 of the entrance/exit E of the vehicle body B, as shown in FIG. 1. Then, a bolt 55 inserted into the bolt hole 13 is screwed into and fixed to the base plate 61 for an accommodation space 62, and thus, the attachment member A is fixed to the vehicle body B. After the attachment member A has been fixed to the base plate 61, the step 60 is attached in such a manner as to cover the attachment member A from above. When the step 60 is fixed to the base plate 61, the accommodation space 62 is formed between the base plate 61 and the step 60. The attachment member A and a terminal portion (not shown) of the wire guiding device G that is connected to the inside of the attachment member A are accommodated in this accommodation space 62.

Figure 22:
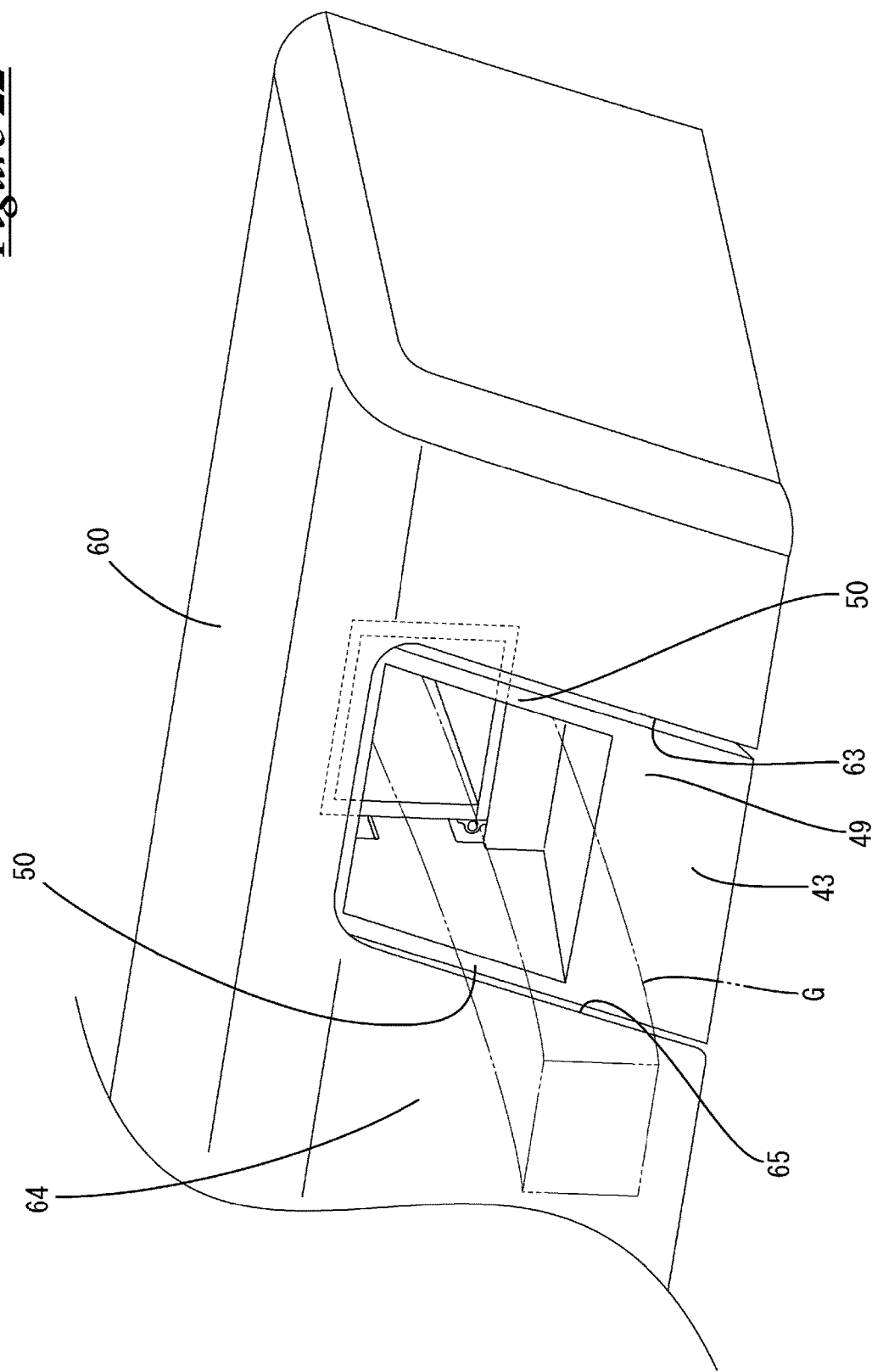
FIG. 22 is a perspective view showing a state in which the attachment member is attached to the vehicle body.

As shown in FIGS. 1 and 22, an opening portion 63 through which the wire guiding device G is led to the outside is formed in the accommodation space 62. The opening portion 63 is constituted by a cut-out portion 65 that is formed in an outer wall portion 64 of the step 60. The step 60 is joined in such a manner as to cover the attachment member A and the wire guiding device G from above, and therefore, in order to avoid interference of the outer wall portion 64 with the wire guiding device the cut-out portion 65 is open in a lower end edge of the outer wall portion 64. Thus, the opening region of the opening portion 63 (cut-out portion 65) extends to a position under the wire guiding device G.

An unnecessarily large opening region of the opening portion 63 will cause wind noise to occur during driving of the automobile V. To address this issue, the attachment member A of the present embodiment is provided with the covering portion 43 serving as a means for closing an unnecessary portion of the opening region of the opening portion 63. The covering portion 43 covers a region below the wire guiding device G and regions on both lateral sides of the wire guiding device of the opening portion 63. Thus, the opening area of the opening portion 63 is reduced, and wind noise is suppressed.

As described above, the attachment member A of Embodiment 1 serves as a means for attaching the terminal portion of the wire guiding device G that is elongated and flexible and that is routed between the vehicle body B and the sliding door D to the vehicle body B. The attachment member A includes the bracket 10, on the outer surface of which the first plate-like attachment portion 15 and the second plate-like attachment portion 16 are formed and which is to be fixed to the vehicle body B, the upper member 30, which is joined to the bracket 10 so as to cover the outer surface of the first plate-like attachment portion 15, and the lower member 40, which is joined to the bracket 10 so as to cover the outer surface of the second plate-like attachment portion 16.

The first locking holes 17, which penetrate the first plate-like attachment portion 15 in the plate thickness direction, the first flexible locking pieces 19, which extend along the opening edges of the respective first locking holes 17, and the first bend-allowing holes 18 are formed in the first plate-like attachment portion 15 of the bracket 10. Each of the first bend-allowing holes 18 is disposed such that a corresponding one of the first flexible locking pieces 19 is sandwiched between that first bend-allowing hole 18 and a corresponding one of the first locking holes 17, and serves as a space for allowing the first flexible locking piece 19 to elastically bend so as to expand the opening area of the first locking hole 17.

On the other hand, the first locking fit-in portions 32, which are to be fitted into the respective first locking holes 17, and the first locking projections 33 are formed in the upper member 30. The first locking projections 33 are formed at the respective first locking fit-in portions 32, and in a state in which the first locking fit-in portions 32 have been fitted into the respective first locking holes 17, the first locking projections 33 engage with the respective first flexible locking pieces 19, thereby locking the upper member 30 and the bracket 10 in a joined state.

Moreover, the second locking holes 20, which penetrate the second plate-like attachment portion 16 in the plate thickness direction, the second flexible locking pieces 22, which extend along the opening edges of the respective second locking holes 20, and the second bend-allowing holes 21 are formed in the second plate-like attachment portion 16. Each of the second bend-allowing holes 21 is disposed such that a corresponding one of the second flexible locking pieces 22 is sandwiched between that second bend-allowing hole 21 and a corresponding one of the second locking holes 20, and serves as a space for allowing the second flexible locking piece 22 to elastically bend so as to expand the opening area of the second locking hole 20.

On the other hand, the second locking fit-in portions 44, which are to be fitted into the respective second locking holes 20, and the second locking projections 45 are formed in the lower member 40. The second locking projections 45 are formed at the respective second locking fit-in portions 44, and in a state in which the second locking fit-in portions 44 are fitted into the respective second locking holes 20, the second locking projections 45 engage with the respective second flexible locking pieces 22, thereby locking the lower member 40 and the bracket 10 in a joined state.

In the attachment member A that is configured as described above, the first locking holes 17, the first flexible locking pieces 19, and the first bend-allowing holes 18, which serve as means for locking the bracket 10 and the upper member 30 in the joined state, do not protrude from the outer surface of the bracket 10, but rather are formed within the range of the first plate-like attachment portion 15 on the outer surface of the bracket 10. Moreover, the second locking holes 20, the second flexible locking pieces 22, and the second bend-allowing holes 21, which serve as means for locking the bracket 10 and the lower member 40 in the joined state, also do not protrude from the outer surface of the bracket 10, but rather are formed within the range of the second plate-like attachment portion 16 on the outer surface of the bracket 10. Accordingly, with the attachment member A of the present embodiment, an increase in size can be avoided.

Moreover, the first flexible locking pieces 19 and the second flexible locking pieces 22 are each in the form of an elongated continuous beam, and are deformed and curved when these pieces are pushed by the first locking projections 33 and the second locking projections 45, respectively, and elastically bend. Then, of both side edge portions of each of the first flexible locking pieces 19 and the second flexible locking pieces 22 that extend along the length direction of the flexible locking piece, the radially inner side of the curvature faces a corresponding one of the first locking holes 17 and second locking holes 20, and the radially outer side of the curvature faces a corresponding one of the first bend-allowing holes 18 and second bend-allowing holes 21.

Focusing on this point, with respect to the length direction of the first flexible locking pieces 19, the formation region of the first bend-allowing holes 18 is set to extend over a larger range than the formation region of the respective first locking holes 17, and with respect to the length direction of the second flexible locking pieces 22, the formation region of the second bend-allowing holes 21 is set to extend over a larger range than the formation region of the respective second locking holes 20. Thus, it is easy for the first flexible locking pieces 19 and the second flexible locking pieces 22 to deform toward the first bend-allowing holes 18 and the second bend-allowing holes 21, respectively, and therefore, the resistance that is generated when the first locking projections 33 and the second locking projections 45 respectively cause the first flexible locking pieces 19 and the second flexible locking pieces 22 to elastically bend can be reduced to a low level.

Moreover, with respect to the length direction of the first flexible locking pieces 19, the formation region of the first locking projections 33 extends over a smaller range than the formation region of the respective first locking fit-in portions 32, and the first locking projections 33 are disposed at the substantially central portions of the respective first locking fit-in portions 32. Similarly, with respect to the length direction of the second flexible locking pieces 22, the formation region of the second locking projections 45 extends over a smaller range than the formation region of the respective second locking fit-in portions 44, and the second locking projections 45 are disposed at the substantially central portions of the respective second locking fit-in portions 44.

With this configuration, the first locking projections 33 and the second locking projections 45 respectively come into contact with the first flexible locking pieces 19 and the second flexible locking pieces 22 only at positions that are located at the substantially central portions of the first flexible locking pieces 19 and the second flexible locking pieces 22 with respect to the length direction, where the amount of elastic displacement is largest. Accordingly, the resistance applied to the first locking projections 33 when the respective first flexible locking pieces 19 elastically bend and the resistance applied to the second locking projections 45 when the respective second flexible locking pieces 22 elastically bend can be reduced to a low level.

Moreover, the sliding contact surfaces 25 that are at substantially right angles to a plate surface of the first plate-like attachment portion 15 are formed on the outer surface of the bracket 10, and the guiding portions 24 that extend in a direction that is at a substantially right angle to the plate surface of the first plate-like attachment portion 15 are formed on each of the sliding contact surfaces 25. Furthermore, the sliding contact portions 34 that can be brought into sliding contact with the respective sliding contact surfaces 25 and the corresponding guiding portions 24 are formed in the upper member 30. With this configuration, when joining the upper member 30 to the bracket 10, the first locking holes 17 are hidden by the upper member 30, and therefore, it is difficult to align the first locking fit-in portions 32 with the respective first locking holes 17 while performing visual observation. However, the above-described configuration makes it possible to align the sliding contact portions 34 of the upper member 30 with the respective sliding contact surfaces 25 and the corresponding guiding portions 24, which are formed on the outer surface of the bracket 10, while visually observing these elements, and thus, the first locking fit-in portions 32 can be reliably fitted into the respective first locking holes 17.

Moreover, the positioning recess 26, in which the lower member 40 is to be positioned and accommodated, is formed in the outer surface of the second plate-like attachment portion 16. With this configuration, when joining the lower member 40 to the bracket 10, the lower member 40 can be positioned relative to the bracket 10, and therefore the operability is favorable. Moreover, the bracket 10 is configured to be accommodated in the accommodation space 62, which is provided below the step 60 of the vehicle body B, and the covering portion 43 that covers the opening portion 63 of the accommodation space 62 is formed in the lower member 40. With this configuration, wind noise while driving can be reduced by covering the opening portion 63 of the accommodation space 62.

Other Embodiments

The present invention is not limited to the embodiment that has been described above with reference to the drawings, and embodiments such as those described below, for example, are also included in the technical scope of the present invention.

According to the foregoing embodiment, with respect to the length direction of the flexible locking pieces, the formation region of the bend-allowing holes is set to extend over a larger range than the formation region of the locking holes. However, the present invention is not limited to this configuration, and the formation region of the bend-allowing holes may be the same as the formation region of the locking holes or may extend over a smaller range than the formation region of the locking holes.

According to the foregoing embodiment, with respect to the length direction of the flexible locking pieces, the locking projections are disposed at substantially central positions of the respective locking fit-in portions; however, each of the locking projections may also be disposed at an end portion or a position that is shifted to an end portion side from the center, of a corresponding one of the locking fit-in portions.

According to the foregoing embodiment, with respect to the length direction of the flexible locking pieces, the formation region of the locking projections is set to extend over a smaller range than the formation region of the locking fit-in portions. However, the present invention is not limited to this configuration, and the formation region of the locking projections may also be the same as the formation region of the locking fit-in portions.

According to the foregoing embodiment, the guiding portions are formed in the bracket; however, a configuration may also be adopted in which no guiding portion is formed in the bracket.

According to the foregoing embodiment, the two assembly members (upper member and lower member) are joined to the bracket; however, the number of assembly members joined to the bracket may be only one or may be three or more.

According to the foregoing embodiment, the sliding contact portions are formed only in the upper member. However, the present invention is not limited to this configuration, and the sliding contact portions may also be formed only in the lower member or may be formed in both the upper member and the lower member.

According to the foregoing embodiment, the positioning recess in which the lower member is to be accommodated is formed; however, a positioning recess in which the upper member is to be accommodated may also be formed.

According to the foregoing embodiment, the covering portion is formed only in the lower member. However, the present invention is not limited to this configuration, and the covering portion may also be formed only in the upper member or may be formed in both the upper member and the lower member.

According to the foregoing embodiment, the attachment member is attached to the vehicle body; however, in the present invention, a configuration may also be adopted in which the attachment member is attached to the sliding door.

According to the foregoing embodiment, the first locking holes and the first bend-allowing holes penetrate the first plate-like attachment portion in the plate thickness direction of the first plate-like attachment portion; however, a configuration may also be adopted in which the first locking holes and the first bend-allowing holes do not penetrate the first plate-like attachment portion.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

LIST OF REFERENCE NUMERALS

A Attachment member
B Vehicle body
D Sliding door
G Wire guiding device
10 Bracket
15 First plate-like attachment portion (plate-like attachment portion)
16 Second plate-like attachment portion (plate-like attachment portion)
17 First locking hole (locking hole)
18 First bend-allowing hole (bend-allowing hole)
19 First flexible locking piece (flexible locking piece)
20 Second locking hole (locking hole)
21 Second bend-allowing hole (bend-allowing hole)
22 Second flexible locking piece (flexible locking piece)
24 Guiding portion
25 Sliding contact surface
26 Positioning recess
30 Upper member (assembly member)
32 First locking fit-in portion (locking fit-in portion)
33 First locking projection (locking projection)
34 Sliding contact portion
40 Lower member (assembly member)
43 Covering portion
44 Second locking fit-in portion (locking fit-in portion)
45 Second locking projection (locking projection)

60 Step
62 Accommodation space
63 Opening portion

The invention claimed is:

1. An attachment member for a wire guiding device, the attachment member comprising:
    a bracket that is configured to be fixed to a vehicle body or a sliding door;
    a plate-like attachment portion that is formed on an outer surface of the bracket;
    a locking hole that is formed in the plate-like attachment portion and extends in a plate thickness direction of the plate-like attachment portion;
    a flexible locking piece that is formed along an opening edge of the locking hole;
    a bend-allowing hole that is formed in the plate-like attachment portion, the bend-allowing hole being disposed so as to sandwich the flexible locking piece between the locking hole and the bend-allowing hole, and allowing the flexible locking piece to elastically bend so as to expand an opening area of the locking hole;
    an assembly member that is configured to be joined to the bracket so as to cover an outer surface of the plate-like attachment portion;
    a locking fit-in portion that is formed in the assembly member and is configured to be fitted into the locking hole; and
    a locking projection that is formed at the locking fit-in portion and is engageable with the flexible locking piece in a state in which the locking fit-in portion is fitted into the locking hole.

2. The attachment member for a wire guiding device according to claim 1,
    wherein the flexible locking piece has an elongated continuous shape, and
    with respect to a length direction of the flexible locking piece, a formation region of the bend-allowing hole extends over a larger range than a formation region of the locking hole.

3. The attachment member for a wire guiding device according to claim 1,
    wherein the flexible locking piece has an elongated continuous shape, and
    with respect to a length direction of the flexible locking piece, a formation region of the locking projection extends over a smaller range than a formation region of the locking fit-in portion, and the locking projection is disposed at a substantially central portion of the locking fit-in portion.

4. The attachment member for a wire guiding device according to claim 1, the attachment member further comprising:
    a sliding contact surface that is formed on the outer surface of the bracket and is at a substantially right angle to a plate surface of the plate-like attachment portion;
    a guiding portion that is formed on the sliding contact surface and extends in a direction that is at a substantially right angle to the plate surface of the plate-like attachment portion; and
    a sliding contact portion that is formed in the assembly member and can be brought into sliding contact with the sliding contact surface and the guiding portion.

5. The attachment member for a wire guiding device according to claim 1, wherein a positioning recess in which the assembly member is to be positioned and accommodated is formed in an outer surface of the plate-like attachment portion.

6. The attachment member for a wire guiding device according to claim 1,
wherein the bracket is configured to be accommodated in an accommodation space that is provided below a step of the vehicle body, and
a covering portion configured to cover an opening portion of the accommodation space is formed in the assembly member.

* * * * *